United States Patent

Tack

[15] 3,635,168
[45] Jan. 18, 1972

[54] ARTICULATED CAR AUXILIARY CENTER BEARING

[72] Inventor: Carl E. Tack, Elmhurst, Ill.
[73] Assignee: AMSTED Industries Incorporated, Chicago, Ill.
[22] Filed: Dec. 19, 1969
[21] Appl. No.: 886,466

[52] U.S. Cl. .......................... 105/4 R, 105/199 C, 308/137
[51] Int. Cl. ..................... B61f 3/12, B61f 5/16, F16c 17/04
[58] Field of Search ................. 105/1 R, 3, 4 R, 4 A, 199 C; 308/137

[56] References Cited

UNITED STATES PATENTS

| | | | |
|---|---|---|---|
| 3,396,673 | 8/1968 | Livelsberger et al. | 105/4 R |
| 3,399,631 | 9/1968 | Weber | 105/4 R |
| 1,851,702 | 3/1932 | Griffin | 105/4 R |
| 3,476,040 | 11/1969 | Karakashian et al. | 105/4 R |

Primary Examiner—Arthur L. La Point
Assistant Examiner—Howard Beltran
Attorney—Walter L. Schlegel, Jr. and Norvell Von Behren

[57] ABSTRACT

An auxiliary center plate assembly for attaching the male end of an articulated car to the bolster of a four-wheel truck. The assembly may be rigidly attached to the bottom portion of the car center sill near the male end. Another form of the invention allows the assembly to be positioned over the male end of the car and to be removably retained thereon by a removable pin.

4 Claims, 4 Drawing Figures

PATENTED JAN 18 1972

3,635,168

Inventor:
Carl E. Jack

By Norvell E. Van Behren
Walter F. Schlegel, Jr.
Attys.

3,635,168

ARTICULATED CAR AUXILIARY CENTER BEARING

BACKGROUND OF THE INVENTION

The present invention relates generally to an adapter unit for an articulated railroad car and more particularly to a new and novel auxiliary center plate assembly that may be attached to the male end of the car and to an existing four-wheel truck in order to support the car on the truck when it is necessary to separate the two articulated cars.

A typical railroad freight may contain a plurality of articulated cars which have adjacent ends together and which are supported by a common four-wheel truck. Such a grouping of articulated cars is shown in the accompanying drawing FIG. 1 and comprises a pair of railroad cars 10 and 12 such as illustrated in U.S. Pat. Nos. 3,399,631 and 3,396,673, respectively, issued in the names of H. B. Weber and K. V. Livelsberger et al., which are connected together by known connector means in the form of a pin 14. The cars 10 and 12 are supported at their outer ends by a pair of independent four-wheel trucks 16 with their adjacent other ends being supported by a common truck 18 similar to the trucks 16.

When it is desired to separate car 10 from car 12 by removing the pin 14 from the aperture 15, the common truck 18 will remain attached to car 10 and the male end 20 of car 12 must be supported by some auxiliary device so that the trailer 22 will remain in a horizontal position. This is accomplished by placing jacks (not shown in the drawing) under the car 12 at the side sills allowing the car 10 to be moved away. However the use of jacks prevents the car 12 from being subsequently moved until a special auxiliary truck or some other supporting device, which may not always be available is positioned under the male end 20.

SUMMARY OF THE INVENTION

In order to overcome these problems there is provided by the present invention a new and novel adapter unit which may be permanently or removably mounted on the male end of the car to allow the male end to be positioned on and held by a readily available existing standard four-wheel freight car truck.

Accordingly it is an object of the invention to provide a new and novel adapter unit for the male end of an articulated car which may be quickly attached to the male end and mounted on a standard four-wheel railroad truck.

Another object of the invention is to provide a new and novel adapted unit which may be permanently fastened on the center sill of an articulated car and may be used to mount the male end of the car on a standard four-wheel railroad truck.

These and other objects will become apparent from a reading of the following detailed specification and from a study of the drawings:

DESCRIPTION OF THE PREFERRED EMBODIMENTS

Figure 1:
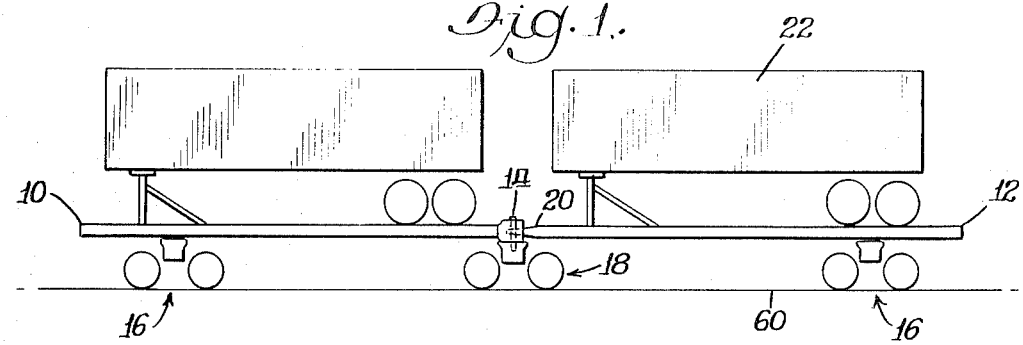
FIG. 1 is a side view of a pair of articulated railroad cars on which the present invention may be used.
Figure 2:
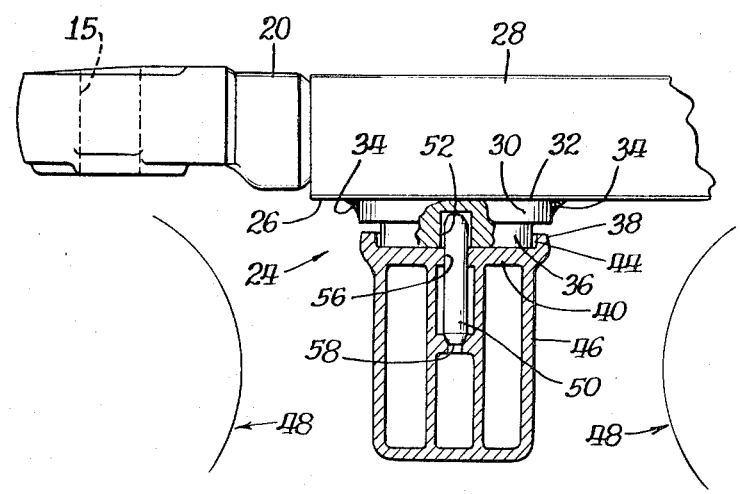
FIG. 2 is an enlarged side view, partially in section, of the male end of the articulated car showing one form of the present invention.

Referring now in detail to FIGS. 1 and 2 of the accompanying drawings, there is shown one form of the present invention which comprises an adapter unit or center bearing assembly, shown generally at 24, rigidly attached to the bottom portion 26 of the center sill 28 of the car 12. The adapter unit comprises an auxiliary center plate member 30 having a substantially flat surface 32 which is positioned on the bottom portion 26 of the center sill 28 and fastened thereto by fastening means in the form of a welded joint 34.

The center plate member 30 has formed on the lower portion thereof a male circular pad or center bearing 36 designed for engagement in the cup-shaped depression 44 formed within the existing mating female casting 38 which is formed on the upper portion 40 of the truck bolster 46. Two wheels of the existing truck are shown generally at 48 in FIG. 2. When the circular pad or center bearing 36 is positioned within the cup-shaped depression 44 it is retained therein by the weight of the articulated car that is bearing on the pad 36. It may be desired to have a more positive means of retaining the circular pad 36 in the depression 44, in which case the adapter unit 24 may be retained on the bolster 46 by a secondary means in the form of a pin 50 one end of which may be received in an existing aperture 52 formed in the central portion of the circular pad 36. The remaining portion of the pin 50 may be positioned within the existing apertures 56 and 58 in the manner shown in FIG. 2 and, combined with the weight of the car 12, serves to retain the adapter unit 24 on the truck bolster 46.

In operation, jacks (not shown in the drawing) are positioned under the side sills of the car 12 and the connecting means 14 is removed thereby allowing the car 10 to be moved away with the car 12 being retained in a horizontal position by the jacks. An existing auxiliary four-wheel truck, having the bolster 46 attached thereto is positioned under the center sill 28. The car 12 is then lowered, by means of the jacks, until the circular pad 36 is positioned in the cup-shaped depression 44. The car 12 is now able to operate freely on the track 60 without being connected to the car 10 since it is retained on the bolster 46 by the weight of the car bearing on the circular pad 36.

If it is desired to utilize the pin connection the four-wheeled truck must be supplied with the pin 50 loosely placed in the apertures 56 and 58. The car 12 would then be lowered until the circular pad 36 is positioned in the cup-shaped depression 44 with the end of the pin 50 being positioned within the aperture 52.

Figure 3:
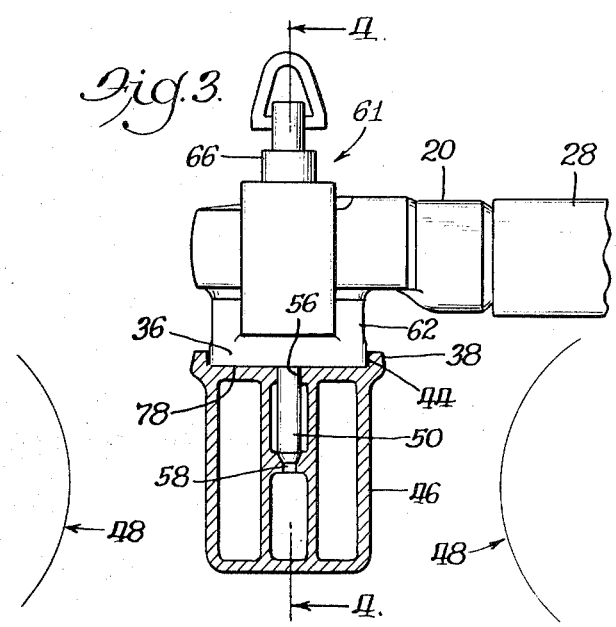
FIG. 3 is an enlarged side view of the male end of the articulated car showing another form of the present invention.
Figure 4:
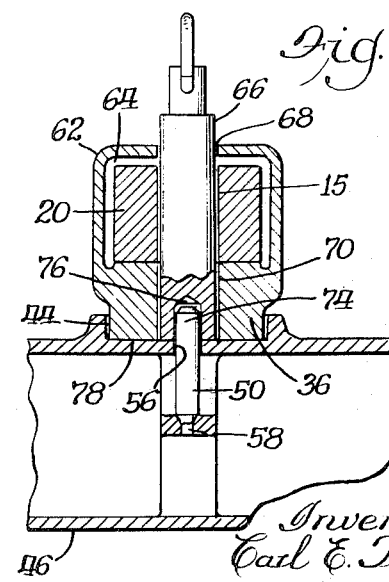
FIG. 4 is a sectional view taken along line 4—4 of FIG. 3.

Referring now to FIGS. 3 and 4 there is shown another form of the invention wherein the auxiliary center plate member of the adapter unit 61 comprises an open-ended casting 62 having an opening 64 therethrough for receiving the male end 20 of the car 12. The adapter unit 61, formed thusly, is removably retained on the male end 20 by means of the fastening means, which, in this form of the invention, comprises an upper pin 66 positioned in an upper aperture 68 in the casting 62 and in a lower aperture 70 as well as an existing aperture 15 formed in the male end 20. The pin 66 may also be the same pin which is used to connect the car section 10 to the car section 12.

The adapter unit 61 also has formed on the bottom portion thereof a male circular pad 36 which is positioned, within the existing mating female casting 38, in the cup-shaped depression 44 in the manner beforementioned. The adapter unit 61 may also be fastened to the truck bolster 46 by the secondary means comprising a lower pin 50 which is retained in the bolster as beforementioned in the apertures 56 and 58. The end 74 of the pin 50 is also positioned within a bore 76 formed in the upper pin 66 to thereby retain the adapter unit 61 on the bolster 46.

In operation with this form of the invention, the car 12 is retained in the horizontal position by jacks, as before mentioned, while the car 10 is rolled away after removing the connector means 14. The adapter unit 61 is then positioned over the male end 20 of the car 12 being removably retained thereon by the pin 66. An existing auxiliary four-wheel truck, having the pin 50 if desired, retained by the apertures 56 and 58 in the bolster 46, is then positioned under the adapter unit 61 and the car is lowered by the jacks onto the bolster until the bottom surface 78 of the adapter unit 61 seats in the cup-shaped depression 44. The car 12 is now able to operate freely on the track 60 without being connected to the car 10 since it is primarily retained on the bolster 46 by the weight of the car bearing on the circular pad 36.

From the foregoing it can be seen that there has been provided a new and novel adapter unit for attaching the male end of an articulated car to the bolster of an existing four-wheel truck to accomplish all of the objects and advantages of the invention. Nevertheless, it is apparent that many changes in details of the construction or arrangement of the parts may be made without departing from the spirit and scope of the invention as expressed in the accompanying claims and the invention is not to be limited to the exact matter shown and described since only the preferred embodiments have been given by way of illustration only.

I claim:

1. In combination, two railway cars, male and female connectors on the adjacent ends of respective cars, a substantially vertical pin extending through said connectors, said connectors being supported by a common truck, independent trucks supporting the remote ends, respectively, of said cars, and a center bearing assembly on the underside of the car on which the male connector is carried, said adapter unit being spaced longitudinally from said male connector and comprising a downwardly projecting center bearing for reception in a cup-shaped depression in the top of an associated auxiliary truck bolster when said pin has been removed to disconnect said male and female connectors and the car on which the female connector is carried has been moved away with the female connector supported by the common truck.

2. A combination according to claim 1 wherein the circular pad has an aperture to received a pin fitted in a complementary aperture of the auxiliary truck bolster.

3. A combination according to claim 1 wherein the circular pad is characterized by a cylindrical member to engage the existing mating depression formed on the auxiliary truck bolster, said cylindrical member having adequate surface for contact with said depression for distribution of weight of said car across the entire bottom surface of the depression and being so engageable with said depression to permit unlimited rotation of the cylindrical member relative to the auxiliary truck bolster.

4. In combination, two railway cars, male and female connectors on the adjacent ends of respective cars, a substantially vertical pin extending through said connectors, said connectors being supported by a common truck, independent trucks supporting the remote ends, respectively, of said cars, and a center bearing assembly positioned over the male connector, sand center bearing assembly being removably retained on said male connector and having a downwardly extending center bearing receivable in a cup-shaped depression in the top of an associated auxiliary truck bolster when said pin has been removed to disconnect said male and female connector and the car on which the female connector is carried has been moved away with the female connector supported by the common truck.

* * * * *